(12) United States Patent
Wang et al.

(10) Patent No.: US 12,202,979 B2
(45) Date of Patent: Jan. 21, 2025

(54) GARDENIA BLUE PIGMENT WITH HIGH BRIGHTNESS AND LOW REDNESS AND A PREPARATION METHOD THEREFOR

(71) Applicants: Yongqiang Wang, Luohe (CN); Ziheng Jin, Luohe (CN); Yanjun Wen, Luohe (CN); Linzheng Li, Luohe (CN); Tianyi Pan, Luohe (CN)

(72) Inventors: Yongqiang Wang, Luohe (CN); Ziheng Jin, Luohe (CN); Yanjun Wen, Luohe (CN); Linzheng Li, Luohe (CN); Tianyi Pan, Luohe (CN)

(73) Assignees: HENAN ZHONGDA HENGYUAN BIOTECHNOLOGY STOCK CO., LTD., Luohe (CN); GLICO NUTRITION CO., LTD., Osaka (JP)

( * ) Notice: Subject to any disclaimer, the term of this patent is extended or adjusted under 35 U.S.C. 154(b) by 0 days.

(21) Appl. No.: 18/369,101

(22) Filed: Sep. 15, 2023

(65) Prior Publication Data

US 2024/0034884 A1   Feb. 1, 2024

Related U.S. Application Data

(63) Continuation of application No. PCT/CN2023/073852, filed on Jan. 30, 2023.

(51) Int. Cl.
C09B 61/00 (2006.01)
C09B 67/54 (2006.01)
C09B 69/10 (2006.01)

(52) U.S. Cl.
CPC .......... *C09B 61/00* (2013.01); *C09B 67/0096* (2013.01); *C09B 69/109* (2013.01)

(58) Field of Classification Search
CPC ................ C09B 61/00; C09B 67/0096; C09B 69/109; C09B 67/0092; C09B 57/00
USPC .............................................................. 8/438
See application file for complete search history.

(56) References Cited

U.S. PATENT DOCUMENTS 4,878,921 A  *  11/1989  Koga ...................... C09B 61/00
                                                                    8/438

FOREIGN PATENT DOCUMENTS

| | | | | |
|---|---|---|---|---|
| CN | 104099373 A | 10/2014 | | |
| CN | 105624198 A | * 6/2016 | ............ | C09B 61/00 |
| KR | 20010096213 A | 11/2001 | | |
| TW | 201811196 A | 4/2018 | | |
| WO | 2017156744 A1 | 9/2017 | | |
| WO | WO 2022047037 A1 | * 3/2022 | ............ | A09B 61/00 |

* cited by examiner

Primary Examiner — Eisa B Elhilo

(57) ABSTRACT

The invention discloses a gardenia blue pigment with high brightness and low redness and a preparation method therefor, and belongs to the technical field of pigment extraction. Genipin, an enzymolysis product of gardenia extract, is used as a raw material. Genipin and amino acids (phenylalanine, tryptophan, glycine, or tyrosine) are weighed at a molar ratio of 1:(0.375-0.75), and subjected to a polymerization reaction under a conventional condition to generate a gardenia blue precursor. The gardenia blue precursor is oxidized to develop a color, refined by using ultrafiltration membrane, and finally spray-dried to obtain the gardenia blue pigment with high brightness, low redness, and low cost.

6 Claims, No Drawings

GARDENIA BLUE PIGMENT WITH HIGH BRIGHTNESS AND LOW REDNESS AND A PREPARATION METHOD THEREFOR

This application is a Continuation Application of PCT/CN2023/073852, filed on Jan. 30, 2023, which claims priority to Chinese Patent Application No. 202211626921.X, filed on Jul. 26, 2022, which is incorporated by reference for all purposes as if fully set forth herein.

TECHNICAL FIELD

The invention belongs to the technical field of pigment extraction, and in particular relates to a gardenia blue pigment with high brightness and low redness and a preparation method therefor.

BACKGROUND

Gardenia blue pigment is a recognized water-soluble natural blue pigment, which is mainly used in industries such as food, cosmetics, dyes, and medicine. There are many methods for preparing gardenia blue at present, but the gardenia blue produced by traditional methods has the disadvantages of low brightness, high redness, and high cost. Chinese invention patent CN104099373A discloses a method for producing a gardenia blue pigment. However, using a method for testing $L^*$, $a^*$ and $b^*$, it is showed that the gardenia blue pigment generated by the method has low brightness and high redness, wherein the brightness $L^*$ is 62 to 63, and the $a^*$ value is $-8$ to $-10$. Chinese invention patent CN113748169A discloses a gardenia blue pigment and a manufacturing method therefor. A gardenia blue with high brightness and low redness is synthesized via two steps of oxygen-free and introducing oxygen by a non-aeration reaction and a color development under aeration of a genipin with a soybean peptide, a sesame peptide, and a rice peptide. The $L^*$ value, $a^*$ value and $b^*$ value tested under the same conditions as the present invention are similar to those of the present invention. However, the soybean peptide, the sesame peptide or the rice peptide is expensive, and the production cost is relatively high, and the soybean peptide is recognized as an allergen, and the soybean peptide needs to be removed in the process, which further increases the production cost.

SUMMARY OF THE INVENTION

In order to overcome the above-mentioned shortcoming of the prior art, the object of the present invention is to provide a gardenia blue pigment with high brightness and low redness and a preparation method therefor, and solve the problems of low brightness, high redness and high cost of the gardenia blue pigment prepared by the prior method.

In order to achieve the above object, the present invention adopts the following technical solutions to achieve:

The invention discloses a method for preparing a gardenia blue pigment with high brightness and low redness, the steps are as follows:

1) weighing a genipin liquid and an amino acid at a molar ratio of 1:(0.375-0.75) for a polymerization reaction to obtain a gardenia blue precursor;
2) oxidizing the gardenia blue precursor to develop a color, and monitoring a color value and a hue at intervals until the color value and the hue do not change, and obtaining a gardenia blue;
3) ultrafiltrating the gardenia blue to remove impurities, concentrating and drying same to obtain the gardenia blue pigment with high brightness and low redness.

Preferably, in step 1), the color value of the genipin is E10-E40.

Preferably, in step 1), the amino acid is one or more of phenylalanine, tryptophan, glycine, and tyrosine.

Preferably, in step 1), the reaction condition is standing at room temperature in bare air.

Preferably, in step 2), an oxidant used in the oxidizing to develop a color is a compressed air, an ozone, a hydrogen peroxide, a peracetic acid or other commonly used oxidants in food.

Preferably, in step 2), stirring is performed at a speed of 200 rpm while the oxidizing is being performed.

Preferably, in step 2), the method for monitoring the color value and the hue is: the gardenia blue after developing the color is weighed, and diluted with ultrapure water to obtain a dilution; the $\lambda_{max}$ of the diluent is determined with a UV-Vis spectrophotometer to obtain the color value; the absorbance of the dilution is adjusted to $1.000\pm0.001$ at $\lambda_{max}$, and a colorimeter is used to determine the $L^*$, $a^*$ and $b^*$ values of the dilution with an absorbance of $1.000\pm0.001$.

Further preferably, the condition for determining the hue with the colorimeter is: light source: D65, observation angle: 10 degrees.

The invention also discloses the gardenia blue pigment prepared by the above preparation method.

Preferably, the $L^*$ of the gardenia blue pigment is 67.72 to 68.56, the $a^*$ is $-27.88$ to $-19.59$, and the $b^*$ is $-29.01$ to $-25.02$.

Compared with the prior art, the present invention has the following beneficial effects:

In the method or preparing a gardenia blue pigment with high brightness and low redness provided by the present invention, firstly the addition ratio of a genipin to an amino acid is changed, that is, the molar addition ratio of the genipin and the amino acid is greater than 1, so that a better result can be obtained compared with the result obtained using a genipin and a peptide; the genipin and the amino acid are used as main raw materials, so that safety is high; meanwhile, compared with the soybean peptide, the sesame peptide and the rice peptide, the amino acid has low cost, is not easy to be sensitized, and has wider application conditions. On the basis of lower production cost, the gardenia blue pigment obtained by this method has a $L^*$ of 67.72 to 68.56, a $a^*$ of $-27.88$ to $-19.59$, and a $b^*$ of $-29.01$ to $-25.02$, so the gardenia blue pigment has the characteristics of high brightness and low redness, and can be used in foods, cosmetics, pharmaceutical products, etc. for coloring.

DETAILED DESCRIPTION OF EMBODIMENTS

In order to enable those skilled in the art to better understand the solutions of the present invention, the technical solutions in the embodiment of the invention will be described clearly and completely with the attached drawings in the embodiment of the invention. Obviously, the described embodiment is only a part of the embodiments of the invention, but not all the embodiments. Based on the embodiments of the present invention, all other embodiments that would have been obtained by those of ordinary skill in the art without involving any inventive effort shall fall within the scope of protection of the present invention.

It should be noted that the terms "first" and "second" in the description and claims of the present invention and the above drawings are used to distinguish similar objects, but not necessarily used to describe a particular order or sequence. It should be understood that the data thus used are interchangeable under appropriate circumstances such that the embodiments of the invention described herein can be practiced in a sequence other than those illustrated or described herein. Furthermore, the terms "comprise" and "have", as well as any variations thereof, are intended to encompass a non-exclusive inclusion, for example, a process, method, system, product, or device comprising a series of steps or units is not necessarily limited to those explicitly listed, but may include other steps or units not explicitly listed or inherent to these processes, methods, products, or devices.

The present invention is described in further detail below in conjunction with accompanying drawings:

The method for preparing a gardenia blue pigment with high brightness, low redness and low-cost provided by the present invention is divided into three steps, specifically as follows:

Step 1: Preparation of a Gardenia Blue Precursor

Weighing a genipin liquid and an amino acid at a molar ratio of 1:(0.375-0.75) for a polymerization reaction to obtain a gardenia blue precursor.

The genipin liquid is prepare by cellulase enzymolysis on a byproduct obtained after gardenia yellow is extracted from gardenia fruit. The concentration of the genipin liquid is calculated by a color value, and the color value is limited between 10 and 40, preferably in a range of 20-30, and more preferably in a range of 24-26. The amino acid is one or more of phenylalanine, tryptophan, tyrosine, and glycine, all of which are commercially available, and the effective content is not limited and the preferred content is 90% to 100%. The specific addition amount needs to be converted. The molar ratio is preferably 1:(0.4-0.7), more preferably 1:(0.5-0.6). The reaction condition comprises, but is not limited to, standing at room temperature in bare air.

Step 2: Oxidation of the Gardenia Blue Precursor to Develop a Color

The gardenia blue precursor obtained in step 1 is oxidized, and the color value and the hue are monitored until the color value and the hue do not change significantly within 1 hour and a gardenia blue is obtained.

The oxidant used in the oxidation comprises but is not limited to a compressed air, an ozone, a hydrogen peroxide, a peracetic acid or other commonly used oxidants in food. The compressed air is preferred as the oxidant. The specific method for monitoring the color value and the hue is as follows:

1) a small amount of the gardenia blue after developing the color is weighed, and diluted with ultrapure water to obtain a dilution; According to GB 28311-2012, the maximum absorption wavelength $\lambda_{max}$ of the diluent is determined with a UV-Vis spectrophotometer to obtain the color value (the formula is as follows):

$$E_{1cm}^{1\%}(\lambda max) = \frac{A \times 1}{c \times 100}$$

wherein, A: the absorbance of the sample at the maximum absorption wavelength $\lambda_{max}$; c: the concentration of the tested sample solution, g/mL; 100: concentration conversion factor;

2) at the maximum absorption wavelength $\lambda_{max}$, the absorbance of the diluent in step 1) is adjusted to 1.000±0.001, and a colorimeter (model: CM-5; Konica-Minolta, Japan) is used to determine the hue, and the determination condition is: light source: D65, observation angle: 10 degrees. The L* value, the a* value and the b* value of the sample are determined, wherein the L* value, the a* value and the b* value represent the brightness, the red-green value, and the yellow-blue value, respectively.

The experimental results are based on the arithmetic mean of the parallel determination results. The absolute difference between the results of two independent determinations obtained under repeated conditions shall not exceed 2%.

Step 3: Refining, Purifying, and Spray-Drying

Under normal temperature conditions, the gardenia blue obtained in step 2 is refined by ultrafiltration to remove impurities, and concentrated. A refined concentrate is obtained and spray-dried to obtain a gardenia blue pigment with high brightness and low redness.

In order to obtain an optimal method for preparing the gardenia blue pigment, the exploration steps of the preparation method are as follows:

The concentration of the genipin liquid is set to E25; the addition ratio of the genipin to the amino acid is changed; and the genipin liquid and the soybean peptide are used as a control group to verify the effect of the molar ratio of the genipin to the amino acid on the chromogenic results. For the verification results, see Table 1:

TABLE 1

Effects of different addition ratios of the genipin and the amino acid on the chromogenic results

|  | Molar ratio | $\lambda_{max}$ | E1 % | L* | a* | b* | ΔE |
| --- | --- | --- | --- | --- | --- | --- | --- |
| Genipin/phenylalanine | 1:1 | 594.5 | 16.96 | 68.52 | −17.04 | −30.26 | Benchmark |
| Genipin/phenylalanine | 1:0.5 | 599.5 | 7.79 | 67.87 | −25.16 | −26.21 | 9.10 |
| Genipin/tryptophan | 1:1 | 599.5 | 8.35 | 66.53 | −22.93 | −27.77 | Benchmark |
| Genipin/tryptophan | 1:0.5 | 606.5 | 2.53 | 64.31 | −31.38 | −13.25 | 16.95 |
| Genipin/tyrosine | 1:1 | 599.5 | 15.61 | 68.48 | −21.05 | −29.33 | Benchmark |
| Genipin/tyrosine | 1:0.5 | 601.5 | 6.77 | 67.24 | −26.52 | −24.08 | 7.68 |
| Genipin/glycine | 1:1 | 587.5 | 14.00 | 63.62 | −6.08 | −33.57 | Benchmark |
| Genipin/glycine | 1:0.5 | 593 | 6.35 | 62.75 | −13.08 | −29.92 | 7.94 |
| Genipin/soybean peptide | 1:1 | 605 | 12.04 | 67.62 | −28.16 | −24.98 | Benchmark |
| Genipin/soybean peptide | 1:0.5 | 605 | 7.83 | 66.5 | −27.32 | −24.63 | 1.44 |

Analysis of the data in Table 1 shows that when changing the addition ratio of the genipin to the phenylalanine, the tryptophan, the tyrosine, and the glycine, the ΔE values are 9.10, 16.95, 7.68 and 7.94, respectively, indicating quite different chromogenic results; when changing the addition ratio of the genipin to the soybean peptide, the ΔE value is 1.44, and the different addition ratios of the two components have almost no effect on the chromogenic results. It can also be seen from the different chromogenic results of the genipin and different raw materials that when the molar ratio of the genipin to the amino acid is 1:0.5, the L* values of the phenylalanine, the tryptophan, the tyrosine, and the glycine are 67.87, 64.3, 67.24 and 62.75, respectively, the a* values are −25.16, −31.38, −26.52 and −13.08, respectively, and the phenylalanine and the tyrosine have high brightness and low redness. And when the molar ratio of the genipin to the amino acid is 1:1, the brightness is slightly increased, but the redness is obviously increased. From the chromogenic data of the genipin and the soybean peptide, it can be seen that when changing the ratio of the two, the hue is almost unchanged, the brightness is high, and the redness is low. From the above analysis of the data, it is known that changing the addition ratio of the genipin to the phenylalanine, the tryptophan, the tyrosine, and the glycine has a great effect on the chromogenic results, while the addition ratio of the genipin and the soybean peptide has no effect on the chromogenic results.

In order to further verify the correctness of the above conclusions, that is, changing the addition ratio of the genipin to the phenylalanine, the tryptophan, the tyrosine, and the glycine has an effect on the hue, and other factors cannot affect the chromogenic results, the present invention adds another experiment, that is, the effect of material concentration on the chromogenic results.

Because the color value and the hue of the phenylalanine in chromogenic results in Table 1 are better, the present invention selects the phenylalanine as the reaction raw material. The molar concentration ratios of the genipin to the phenylalanine are set to 0.2 mol/L:0.2 mol/L, 0.15 mol/L: 0.15 mol/L, 0.1 mol/L:0.1 mol/L and 0.2 mol/L:0.1 mol/L, respectively, and experiments are carried out through the process methods in the preparation process steps 1 and 2.

amount of the phenylalanine can effectively reduce the redness of the chromogenic liquid.

Combining the effects of the addition ratios of the genipin to different amino acids on the chromogenic results, and the effect of the molar concentration ratio of the genipin to the phenylalanine on the chromogenic results, it can be concluded that under the same process conditions, only reducing the amount of the amino acid, that is, reducing the addition ratio of the amino acid to the genipin, can effectively reduce the redness of the chromogenic liquid of the gardenia blue; and for the soybean peptide, the gardenia blue is not affected by the addition ratio. In order to obtain the gardenia blue with high brightness and low redness in the present invention, it is necessary to further determine the addition ratio range of the genipin to the amino acid. Under the same conditions, in the chromogenic reaction of the genipin with the phenylalanine, the tryptophan, the tyrosine and the glycine respectively, when the addition ratio is 1:0.5, the color value of the gardenia blue is the highest for the phenylalanine, and the brightness L* of the chromogenic liquid is 67.87, and the redness a* is −25.16. Comprehensively considering the hue and the production cost, the present invention particularly selects the phenylalanine as an optimal reaction raw material.

The following experiment uses the phenylalanine and the genipin as raw materials. The addition ratio range of the genipin to the amino acid is further determined by changing the addition ratio of the genipin to the phenylalanine, while maintaining the target hue, combined with the color value of the gardenia blue liquid at the end of the color development.

The molar ratio of the genipin to the phenylalanine is set to 1:0.25, 1:0.375, 1:0.5, 1:0.75 and 1:1, respectively, and experiments are carried out according to the process methods in the preparation process steps 1 and 2.

TABLE 2

Effect of molar concentration ratio of the genipin to the phenylalanine on chromogenic results

| Molar concentration ratio (Genipin/phenylalanine) | $\lambda_{max}$ | E1 % | L* | a* | b* | ΔE (color difference of chromogenic liquid) |
|---|---|---|---|---|---|---|
| 0.2 mol/L:0.2 mol/L | 594 | 17.26 | 68.84 | −17.16 | −29.91 | Benchmark |
| 0.15 mol/L:0.15 mol/L | 594 | 13.19 | 68.47 | −17.28 | −30.11 | 0.44 |
| 0.1 mol/L:0.1 mol/L | 596 | 8.57 | 68.51 | −17.98 | −29.92 | 0.88 |
| 0.2 mol/L:0.1 mol/L | 600 | 7.93 | 68.37 | −25.6 | −25.75 | 9.42 |

As can be seen from the experimental data in Table 2, when the concentration ratio of the genipin to the phenylalanine is 0.2 mol/L:0.2 mol/L, 0.15 mol/L:0.15 mol/L and 0.1 mol/L:0.1 mol/L, the color difference ΔE of the chromogenic liquid is 0.44 and 0.88, respectively, and there is almost no difference in the hues of the three groups, but the color values of the three groups decrease with the decrease of the material concentration, and are 17.26, 13.19 and 8.57, respectively. When the molar concentration ratio of the genipin to the phenylalanine is 0.2 mol/L:0.1 mol/L, the brightness L* of the chromogenic liquid is 68.37, the redness a* is −25.6, and the color difference ΔE from the hues of the above three groups is 9.42, showing a large difference. From the above data analysis results, it can be seen that changing the material concentration has almost no effect on the degree of change in the hue, and reducing the

TABLE 3

Effects of different molar ratios of the genipin to the phenylalanine on chromogenic results

| Molar ratio (Genipin/phenylalanine) | $\lambda_{max}$ | E1% | L* | a* | b* |
|---|---|---|---|---|---|
| 1:0.25 | 626 | 2.56 | 66.28 | −30.25 | −12.78 |
| 1:0.375 | 604 | 4.49 | 67.77 | −27.62 | −22.98 |
| 1:0.5 | 599.5 | 7.79 | 67.87 | −25.16 | −26.21 |
| 1:0.75 | 596.5 | 12.58 | 68.66 | −19.39 | −29.33 |
| 1:1 | 594.5 | 16.96 | 68.52 | −17.04 | −30.26 |

It can be seen from the data in Table 3 that when the molar ratio of the genipin to the phenylalanine is 1:0.25, the redness of the chromogenic liquid is low (a* is −30.25), but the color value of the chromogenic liquid is only 2.56, which is not meets the production requirements, and b* is −12.78. The chromogenic liquid of the gardenia blue is greenish rather than blue after dilution. Therefore, when the molar ratio of the genipin to the phenylalanine is 1:0.25, the gardenia blue cannot be produced. When the molar ratio of the genipin to the phenylalanine is 1:1, the L* value, the a* value and the b* value are 68.52, −17.04 and −30.26, respectively, but the redness also increases. However, when the molar ratio of the genipin to the phenylalanine is in the range of 1:(0.375-0.75), the brightness of the gardenia blue is high, and the redness value is low. Therefore, the optimal range of the molar ratio of the genipin to the amino acid in the present invention is 1: (0.375-0.75).

The present invention prepares a gardenia blue with high brightness, low redness and low cost and improves the application quality of the gardenia blue by adjusting the addition ratio of genipin to an amino acid and utilizing the preparation of a gardenia blue precursor and the oxidation and chromogenic process of the gardenia blue. The following examples and Table 4 are detailed descriptions of the present invention.

Example 1

(1): Preparation of a Gardenia Blue Precursor

The enzymolysis solution of geniposide with a high color value (a gardenia liquid) was mixed with water and diluted until the color value was E25. 850 g of the diluted solution was weighed, and the temperature was raised to 35° C. After the temperature was stabilized, 1 g of sodium dihydrogen phosphate dihydrate and 7 g of disodium hydrogen phosphate dihydrate were added, the pH was adjusted to 7.49 with 30% NaOH solution, and 16.5 g of phenylalanine was added and held for 24 hours to obtain the gardenia blue precursor.

(2) Oxidation of the Gardenia Blue Precursor to Develop a Color

Compressed air was introduced into the gardenia blue precursor, and stirring was started at a stirring speed of 200 rpm. The maximum absorption wavelength $\lambda_{max}$ of the reaction solution and the color value $E_{\lambda max}$ at the maximum absorption wavelength were determined with a UV-Vis spectrophotometer every 1 hour, and a colorimeter was used to determine the hue of the solution with an absorbance of 1.000±0.001, that is, the L* value, a* value, and b* value. After 30 hours of oxidation and color development, the color value of the final chromogenic liquid is $E_1\ _{cm}^{1\%}$ ($\lambda_{max}$)=7.79, the maximum absorption wavelength is 599.5 nm, and then the final chromogenic liquid was refined by using an ultrafiltration membrane and spray-dried to obtain a gardenia blue powder. When the gardenia blue powder has Abs=1.000 at a wavelength of 599.5 nm, its brightness L* is 67.87, a* is −25.16, b* is −26.21.

Example 2

(1): Preparation of a Gardenia Blue Precursor

The enzymolysis solution of geniposide with a high color value (a gardenia liquid) was mixed with water and diluted until the color value was E25. 850 g of the diluted solution was weighed, and the temperature was raised to 35° C. After the temperature was stabilized, 1 g of sodium dihydrogen phosphate dihydrate and 7 g of disodium hydrogen phosphate dihydrate were added, the pH was adjusted to 7.51 with 30% NaOH solution, and 16.5 g of phenylalanine was added and held for 24 hours to obtain the gardenia blue precursor.

(2) Oxidation of the Gardenia Blue Precursor to Develop a Color

Compressed air was introduced into the gardenia blue precursor, and stirring was started at a stirring speed of 200 rpm. The maximum absorption wavelength $\lambda_{max}$ of the reaction solution and the color value $E_{\lambda max}$ at the maximum absorption wavelength were determined with a UV-Vis spectrophotometer every 1 hour, and a colorimeter was used to determine the hue of the solution with an absorbance of 1.000±0.001, that is, the L* value, a* value, and b* value. After 31 hours of oxidation and color development, the color value of the final chromogenic liquid is $E_1\ _{cm}^{1\%}$ ($\lambda_{max}$)=7.88, the maximum absorption wavelength is 600 nm, and then the final chromogenic liquid was refined by using an ultrafiltration membrane and spray-dried to obtain a gardenia blue powder. When the gardenia blue powder has Abs=1.000 at a wavelength of 600 nm, its brightness L* is 68.25, a* is −25.33, b* is −25.98.

Example 3

(1): Preparation of a Gardenia Blue Precursor

The enzymolysis solution of geniposide with a high color value (a gardenia liquid) was mixed with water and diluted until the color value was E20. 850 g of the diluted solution was weighed, and the temperature was raised to 35° C. After the temperature was stabilized, 1 g of sodium dihydrogen phosphate dihydrate and 7 g of disodium hydrogen phosphate dihydrate were added, the pH was adjusted to 7.48 with 30% NaOH solution, and 13.2 g of phenylalanine was added and held for 24 hours to obtain the gardenia blue precursor.

(2) Oxidation of the Gardenia Blue Precursor to Develop a Color

Compressed air was introduced into the gardenia blue precursor, and stirring was started at a stirring speed of 200 rpm. The maximum absorption wavelength $\lambda_{max}$ of the reaction solution and the color value $E_{\lambda max}$ at the maximum absorption wavelength were determined with a UV-Vis spectrophotometer every 1 hour, and a colorimeter was used to determine the hue of the solution with an absorbance of 1.000±0.001, that is, the L* value, a* value, and b* value. After 30 hours of oxidation and color development, the color value of the final chromogenic liquid is $E_1\ _{cm}^{1\%}$ ($\lambda_{max}$)=6.89, the maximum absorption wavelength is 602 nm, and then the final chromogenic liquid was refined by using an ultrafiltration membrane and spray-dried to obtain a gardenia blue powder. When the gardenia blue powder has Abs=1.000 at a wavelength of 602 nm, its brightness L* is 68.56, a* is −27.88, b* is −25.02.

Example 4

(1): Preparation of a Gardenia Blue Precursor

The enzymolysis solution of geniposide with a high color value (a gardenia liquid) was mixed with water and diluted until the color value was E25. 850 g of the diluted solution was weighed, and the temperature was raised to 35° C. After the temperature was stabilized, 1 g of sodium dihydrogen phosphate dihydrate and 7 g of disodium hydrogen phosphate dihydrate were added, the pH was adjusted to 7.42 with 30% NaOH solution, and 19.43 g of phenylalanine was added and held for 24 hours to obtain the gardenia blue precursor.

(2) Oxidation of the Gardenia Blue Precursor to Develop a Color

Compressed air was introduced into the gardenia blue precursor, and stirring was started at a stirring speed of 200 rpm. The maximum absorption wavelength $\lambda_{max}$ of the reaction solution and the color value $E_{\lambda max}$ at the maximum absorption wavelength were determined with a UV-Vis spectrophotometer every 1 hour, and a colorimeter was used to determine the hue of the solution with an absorbance of 1.000±0.001, that is, the L* value, a* value, and b* value.

After 29 hours of oxidation and color development, the color value of the final chromogenic liquid is $E_1{}_{cm}^{1\%}$ ($\lambda_{max}$)=8.02, the maximum absorption wavelength is 598.5 nm, and then the final chromogenic liquid was refined by using an ultrafiltration membrane and spray-dried to obtain a gardenia blue powder. When the gardenia blue powder has Abs=1.000 at a wavelength of 598.5 nm, its brightness L* is 67.72, a* is −25.01, b* is −27.13.

Example 5

(1): Preparation of a Gardenia Blue Precursor

The enzymolysis solution of geniposide with a high color value (a gardenia liquid) was mixed with water and diluted until the color value was E25. 850 g of the diluted solution was weighed, and the temperature was raised to 35° C. After the temperature was stabilized, 1 g of sodium dihydrogen phosphate dihydrate and 7 g of disodium hydrogen phosphate dihydrate were added, the pH was adjusted to 7.47 with 30% NaOH solution, and 24.75 g of phenylalanine was added and held for 24 hours to obtain the gardenia blue precursor.

(2) Oxidation of the Gardenia Blue Precursor to Develop a Color

Compressed air was introduced into the gardenia blue precursor, and stirring was started at a stirring speed of 200 rpm. The maximum absorption wavelength $\lambda_{max}$ of the reaction solution and the color value $E_{\lambda max}$ at the maximum absorption wavelength were determined with a UV-Vis spectrophotometer every 1 hour, and a colorimeter was used to determine the hue of the solution with an absorbance of 1.000±0.001, that is, the L* value, a* value, and b* value.

After 30 hours of oxidation and color development, the color value of the final chromogenic liquid is $E_1{}_{cm}^{1\%}$ ($\lambda_{max}$)=9.97, the maximum absorption wavelength is 597 nm, and then the final chromogenic liquid was refined by using an ultrafiltration membrane and spray-dried to obtain a gardenia blue powder. When the gardenia blue powder has Abs=1.000 at a wavelength of 597 nm, its brightness L* is 68.55, a* is −19.59, b* is −29.01.

The color comparison was performed on the gardenia blue powder prepared in Examples 1 to 5 and the purchased external sample 1 (a gardenia blue pigment, CAS: 106441-42-3, purchased from Hebei Chuangzhiyuan Biotechnology Co., Ltd.) and external sample 2 (a gardenia blue pigment, CAS: 106441-42-3, purchased from Wuhan Lullaby Pharmaceutical Chemical Co., Ltd), and the results are shown in Table 4:

TABLE 4

Chromogenic results of different examples

| Sample name | $\lambda_{max}$ | L* | a* | b* |
|---|---|---|---|---|
| Example 1 | 599.5 | 67.87 | −25.16 | −26.21 |
| Example 2 | 600 | 68.25 | −25.33 | −25.98 |
| Example 3 | 602 | 68.56 | −27.88 | −25.02 |
| Example 4 | 598.5 | 67.72 | −25.01 | −27.13 |
| Example 5 | 597 | 68.55 | −19.59 | −29.01 |
| External sample 1 | 592 | 60.31 | −10.83 | −32.72 |
| External sample 2 | 604 | 63.89 | −21.59 | −28.66 |

As can be seen from Table 4, the brightness of the gardenia blue powder prepared in Examples 1-5 is all better than that of the external sample 1 and external sample 2; the redness of the gardenia blue powder prepared in Examples 1-5 is all lower than that of the external sample 1; and the redness of the gardenia blue powder prepared in Examples 1-4 is all lower than the external sample 2, showing that the gardenia blue pigment prepared by this method has high brightness and low redness.

The above content is only to illustrate the technical idea of the present invention, and cannot limit the protection scope of the present invention. Any changes made on the basis of the technical solution according to the technical idea proposed in the present invention fall into the protection scope of the claims of the present invention.

The invention claimed is:

1. A method for preparing a gardenia blue pigment with high brightness and low redness, comprising following steps:
   1) Weighing a genipin liquid and an amino acid at a molar ratio of 1:(0.375-0.75) for a polymerization reaction to obtain a gardenia blue precursor;
   2) oxidizing the gardenia blue precursor to develop a color, and monitoring a color value and a hue at intervals until the color value and the hue do not change, and obtaining a gardenia blue;
   3) ultrafiltrating the gardenia blue to remove impurities, concentrating and drying the gardenia blue to obtain the gardenia blue pigment with high brightness and low redness,
   wherein, in step 1), the polymerization reaction is conducted at room temperature in bare air.

2. The method for preparing a gardenia blue pigment with high brightness and low redness of claim 1, wherein, in step 1), the amino acid is one or more selected from the group consisting of phenylalanine, tryptophan, glycine and tyrosine.

3. The method for preparing a gardenia blue pigment with high brightness and low redness of claim 1, wherein, in step 2), an oxidant used in the oxidizing to develop the color is a compressed air, an ozone, a hydrogen peroxide, or a peracetic acid.

4. The method for preparing a gardenia blue pigment with high brightness and low redness of claim 1, wherein in step 2), a stirring of the gardenia blue precursor is performed at a speed of 200 rpm while the oxidizing is being performed.

5. The method for preparing a gardenia blue pigment with high brightness and low redness of claim 1, wherein, in step 2), monitoring the color value and the hue comprises: the gardenia blue after developing the color is weighed, and diluted with ultrapure water to obtain a dilution; the $\lambda_{max}$ of the diluent is determined with a UV-Vis spectrophotometer to obtain the color value; the absorbance of the dilution is adjusted to 1.000±0.001 at $\lambda_{max}$, and a colorimeter is used to determine the L*, a* and b* values of the dilution with an absorbance of 1.000±0.001.

6. A gardenia blue pigment, prepared by the method of claim 1, wherein the L* of the gardenia blue pigment is 67.72 to 68.56, the a* is −27.88 to −19.59, and the b* is −29.01 to −25.02.

* * * * *